(12) United States Patent
Rockwood

(10) Patent No.: US 12,229,885 B1
(45) Date of Patent: Feb. 18, 2025

(54) SURFACE-TO-SURFACE INTERSECTIONS IN COMPUTER-AIDED GRAPHICS AND MODELING

(71) Applicant: Zoo, Malibu, CA (US)

(72) Inventor: Alyn Rockwood, Boulder, CO (US)

( * ) Notice: Subject to any disclaimer, the term of this patent is extended or adjusted under 35 U.S.C. 154(b) by 0 days.

(21) Appl. No.: 18/662,056

(22) Filed: May 13, 2024

(51) Int. Cl.
*G06T 17/00* (2006.01)

(52) U.S. Cl.
CPC .......... *G06T 17/00* (2013.01); *G06T 2210/21* (2013.01); *G06T 2210/52* (2013.01); *G06T 2210/56* (2013.01)

(58) Field of Classification Search
None
See application file for complete search history.

(56) References Cited

U.S. PATENT DOCUMENTS

| | | | | |
|---|---|---|---|---|
| 2004/0001060 A1* | 1/2004 | Stollnitz | ................. | G06T 17/20 345/423 |
| 2005/0231530 A1* | 10/2005 | Liang | ..................... | G06T 19/00 345/619 |
| 2014/0185873 A1* | 7/2014 | Li | ......................... | G06V 20/64 382/103 |
| 2017/0177960 A1* | 6/2017 | Boulanger | ............ | G01B 11/24 |
| 2021/0316463 A1* | 10/2021 | Ku | .......................... | G06T 17/00 |

OTHER PUBLICATIONS

Adarsh Krishnamurthy, Parallel GPU Algorithms for Mechanical CAD, UC Berkeley Electronic Theses and Dissertations, 2010, 1-128, University of California, Berkeley, CA.
Adarsh Krishnamurthy, 'Performing Efficient NURBS Modeling Operations on the GPU', SPM '08 Proceedings of the 2008 ACM symposium on Solid and physical modeling, Jun. 4, 2008, pp. 257-268, Stony Brook, NY.
Michael Edward Hohmeyer; 'Robust and Efficient Surface Intersection for Solid Modeling', University of California at Berkeley, Feb. 10, 1992, pp. 1-121, University of California at Berkeley, Berkeley, CA.

* cited by examiner

*Primary Examiner* — Frank S Chen
(74) *Attorney, Agent, or Firm* — MP Patents, LLC

(57) ABSTRACT

A computer-implemented method for computing an intersection between first and second surfaces of one or more 3D models includes receiving a description for each of the first and second surfaces, using the descriptions to compute one or more intersection curves and outputting the one or more intersection curves.

16 Claims, 13 Drawing Sheets

SURFACE-TO-SURFACE INTERSECTIONS IN COMPUTER-AIDED GRAPHICS AND MODELING

TECHNICAL FIELD

The disclosure relates generally to techniques for three-dimensional (3D) modeling. More specifically, it pertains to techniques for determining the intersection of two surfaces using enhanced Surface-to-Surface Intersection (SSI) computations.

BACKGROUND 3D surface modeling plays a pivotal role in numerous industries, encompassing computer-aided design (CAD), computer gaming, and animation. It is often useful to identify the intersection of two surfaces in 3D modeling. Such an intersection may be suitable for use in various applications such as object modeling, trimming, and collision detection. However, traditional approaches to computing SSI are computationally demanding and tend to be slow, particularly with intricate surfaces or extensive datasets.

SUMMARY

The disclosure describes a computer-implemented method for computing an intersection between first and second surfaces of one or more 3D models. The method includes receiving a description for each of the first and second surfaces, using the descriptions to compute one or more intersection curves and outputting the one or more intersection curves.

Further, the disclose describes a system for computing an intersection. The system includes a memory, a storage and a parallel computing processor. The parallel computing processor is configured by instructions stored on the memory to receive a description for each of the first and second surfaces, to use the descriptions to compute one or more intersection curves and to output the one or more intersection curves.

The disclosure also describes a non-transitory computer readable medium for computing an intersection. The non-transitory computer readable medium includes computer readable instructions which, when executed by a processor, cause one or more computers to receive a description for each of the first and second surfaces, use the descriptions to compute one or more intersection curves and output the one or more intersection curves.

Further still, the disclosure describes a computer-implemented method for determining a set of intersection points between first and second surfaces of one or more 3D models. The method includes receiving a description for each of the first and second surfaces, from the description of the first surface, deriving a set of points representing the first surface and forming the set of intersection points from points representing the first surface which are distanced from the second surface by less than a threshold distance.

BRIEF DESCRIPTION OF THE FIGURES

The summary above, as well as the following detailed description of illustrative embodiments, is better understood when read in conjunction with the appended drawings. For the purpose of illustrating the disclosure, example constructions of the disclosure are shown in the drawings. However, the disclosure is not limited to specific methods and instrumentalities disclosed herein. Moreover, those of ordinary skill in the art will understand that the drawings are not to scale. Wherever possible, like elements have been indicated by identical numbers.

Embodiments of the disclosure will now be described, by way of example only, with reference to the following diagrams wherein.

DETAILED DESCRIPTION

The following detailed description illustrates embodiments of the disclosure and manners by which they can be implemented. Although the best mode of carrying out the present disclosure has been set forth herein, those of ordinary skill in the art would recognize that other embodiments for carrying out or practicing the disclosure are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Known processes for determining surface intersections, while accurate, can be computationally intensive and slow, especially for complex surfaces or when high precision is required. Other known processes introduce approximation errors and may not capture the exact geometric details of an intersection.

Consequently, there is a need for a system to calculate SSI that is not only efficient and precise but also faster, in part, by leveraging parallel processing power such as embodied in the contemporary graphics processing units (GPUs). Disclosed methods and associated systems seek to blend the accuracy of traditional SSI techniques with the computational efficiency of modern GPU-based approaches.

Embodiments of the disclosure provide a computer-implemented method for computing SSI by introducing a parallel processor-accelerated algorithm that significantly reduces computation time while maintaining high accuracy. The system involves converting each of the two surfaces into point clouds, comparing points between these clouds within a defined tolerance or threshold, and generating a new point cloud closely approximating the intersection of the two surfaces. The method is enhanced by mapping points to their parameter space, and then further processing the points such as by, for example, curve interpolation and/or convolution. The resulting curve in parameter space can be mapped back to the object. This approach not only accelerates the process of finding intersections but also provides a framework for preserving geometric information between points, enhancing the utility and accuracy of 3D surface modeling.

Additional aspects, advantages, features and objects of the disclosure will be made apparent from the drawings and the detailed description of the illustrative embodiments construed in conjunction with the appended claims that follow.

It will be appreciated that features of the disclosure are susceptible to being combined in various combinations without departing from the scope of the disclosure as defined by the appended claims.

Figure 1:
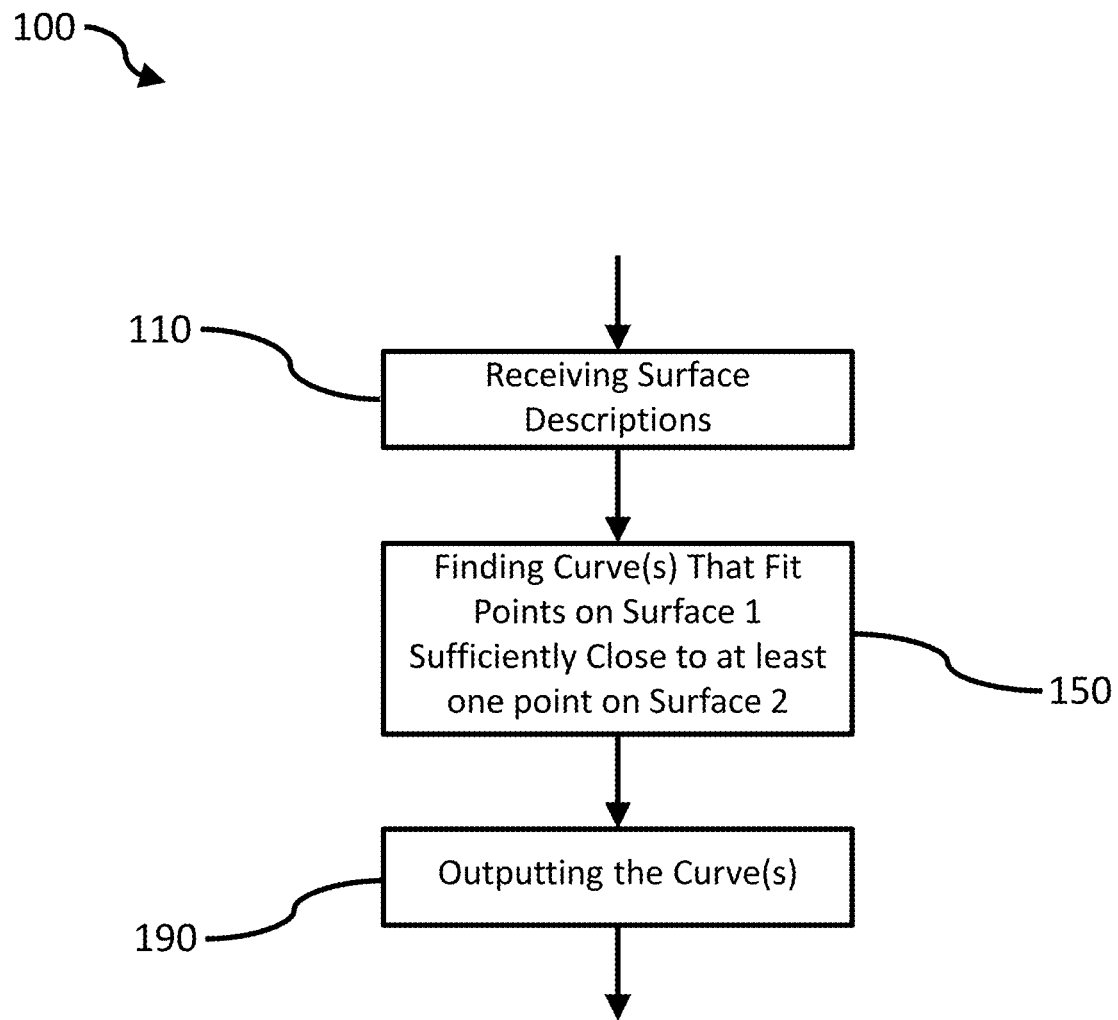
FIG. 1 illustrates an overview flow of an example computer-implemented method for locating an intersection.
Figure 2:
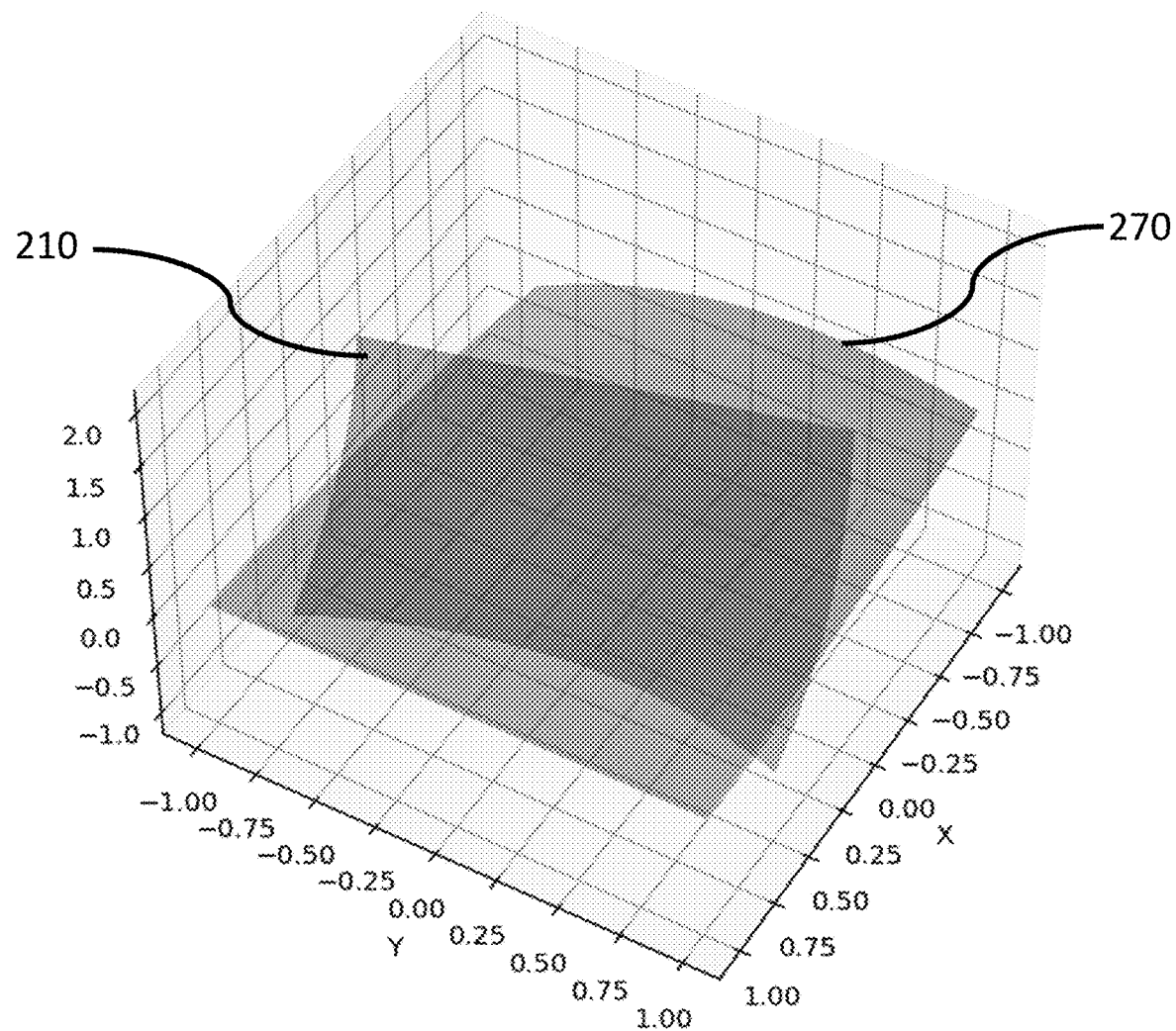
FIG. 2 illustrates an example set of intersecting surfaces.

FIGS. 1 & 2 illustrate actions of a computer-implemented method for computing an intersection between first and second surfaces, in accordance with an embodiment of the disclosure. In part, the method is depicted as a collection of actions in a logical flow diagram, which represents a sequence of actions that may be implemented in hardware, software, or a combination thereof.

The method may find, determine, establish, locate, identify, describe or obtain the intersection which may exist between first and second surfaces of one or more 3D models in a parameter space and/or in an object space. The 3D models may be computer-aided design (CAD) models, computer-aided modeling (CAM) models, computer-aided-engineering (CAE) models and/or computer-aided animation models. A description of an output intersection may include a set of intersection points and/or a set of intersection curves.

Referring to FIG. 1, in a simple example, disclosed methods, may take the form of method 100 which includes receiving descriptions for first and second surfaces at 110 and, at 150, finding one or more curves that fit points on the first surface which are sufficiently close to at least one point on the second surface. The first and second surfaces may be described by data such as one or more collections of computer-readable and screen displayable data descriptive of the first and second surfaces in a parameter space, such as parametric descriptions. Alternatively, the descriptions received may be defined within an object space in which case, the descriptions may be mapped from the object space to a parameter space so that the first and second surfaces are parameterized. File formats used may be neutral or open source or may be proprietary with example formats including but not being limited to IGES, STEP, STL, QIF, 3D PDF, ACIS and Parasolids. FIG. 2 illustrates an example set of intersecting surfaces in an object space including a first intersection surface 210 and a second intersection surface 270. Curves found at 150 are output at 190.

Figure 3:
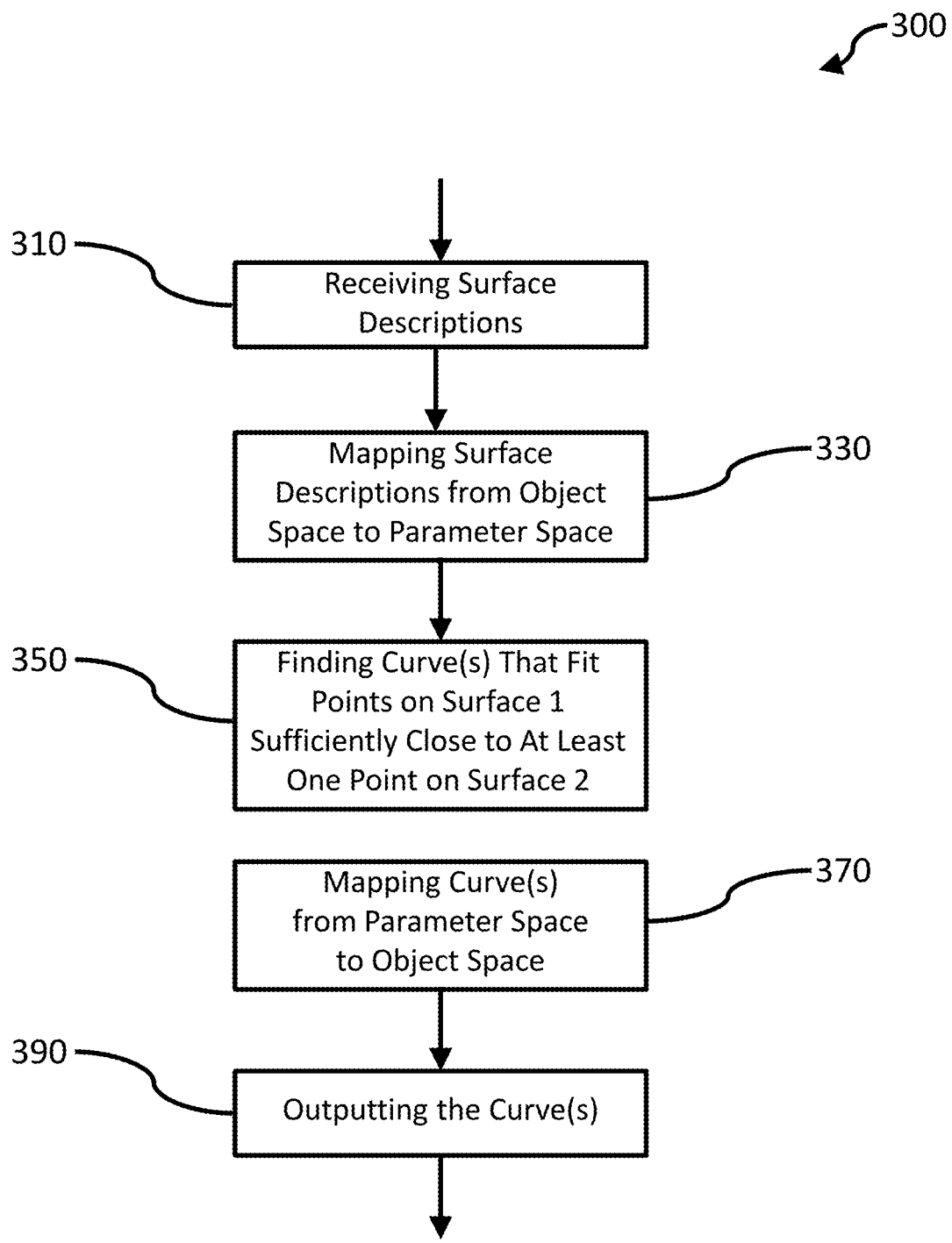
FIG. 3 illustrates a flow of another example computer-implemented method for locating an intersection.

Referring to FIG. 3, in another simple example, disclosed methods may take the form of method 300 which includes receiving descriptions for intersecting surfaces at 310 and, in cases where the descriptions do not provide paramaterized first and second surfaces, mapping the surface descriptions from object space to parameter space at 330. With the surfaces mapped to parameter space, one or more curves are found at 350 which fit points of the first surface sufficiently close to at least one point on the second surface. Method 300 further includes mapping the curves found at 350 from parameter space to an object space at 370 and outputting the curves at 390.

The actions described above with reference to FIGS. 1-3 are only illustrative and other alternatives can also be provided where one or more actions are added, one or more actions are removed, or one or more actions are provided in a different sequence without departing from the scope of the claims herein.

Figure 4:
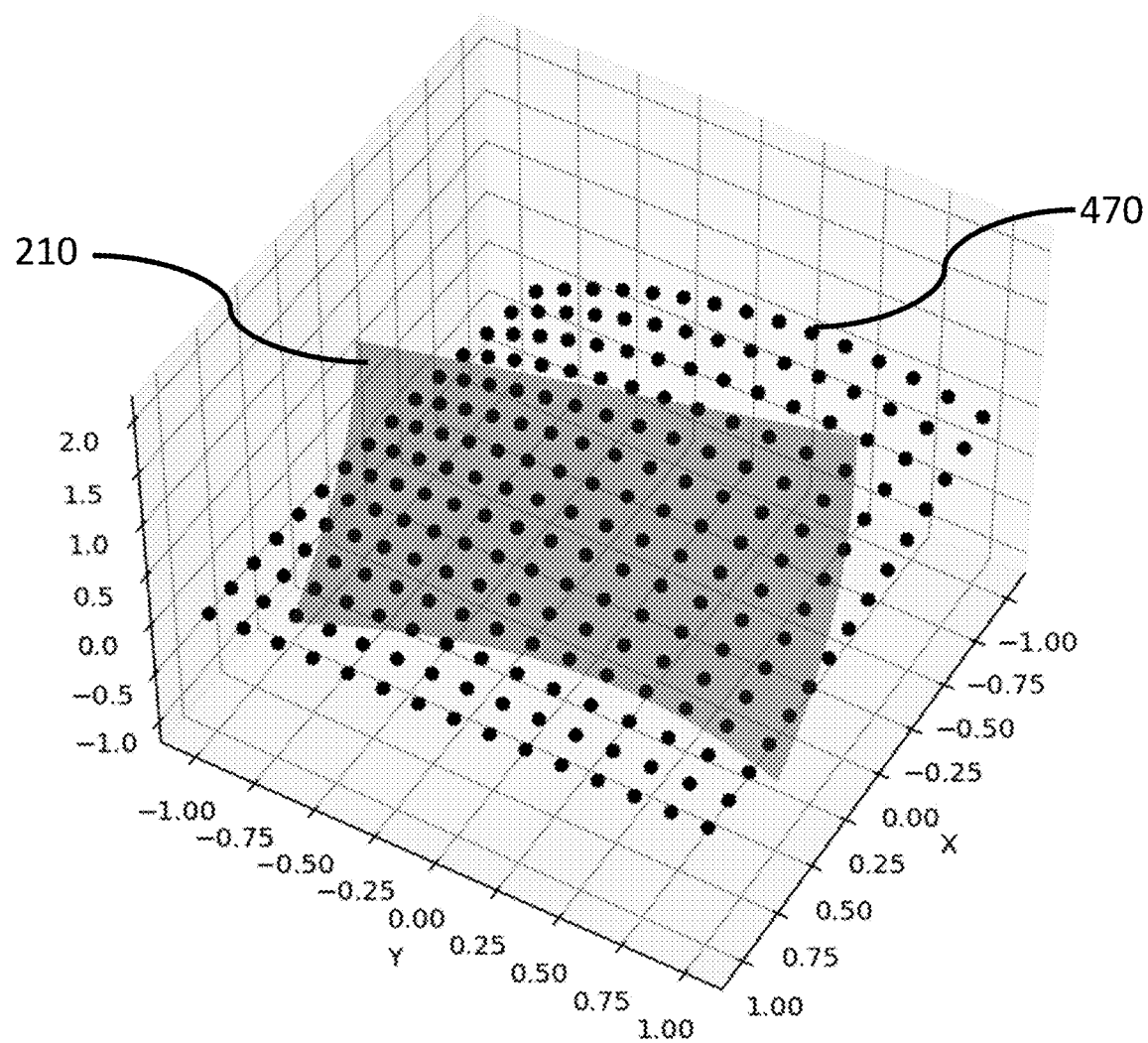
FIG. 4 illustrates the example set of intersecting surfaces of FIG. 1 with one surface depicted as a point cloud.

When point descriptions of the first and second surfaces have not been provided, it may be necessary to, from the descriptions of the first and second surfaces, generate, derive or define a first set or cloud of points lying on, at and/or otherwise representing the first surface and a second set or cloud of points lying on, at and/or otherwise representing the second surface. For example, the set of points may be generated at or on each of the first and second surfaces by simply evaluating parametric polynomial descriptions of the surfaces over a chosen or pre-established grid of values. Further, generating the surface point sets may include flood filling, practice of Horner's method or a combination of these. FIG. 4 illustrates the example set of intersecting surfaces of FIG. 2 with surface 270 shown as a point cloud or set of points 470.

In an efficiency improvement, divide and conquer techniques such as those employing quad trees or oct trees may eliminate, from evaluation and/or analysis, regions where intersection of the surfaces can be ruled out. For example, if evaluation of one of the surfaces does not yield values within a particular subdivision of the space containing the surfaces, this subdivision does not need to be considered for intersection of the surfaces and a different subdivision can be checked for values from both surfaces. Alternatively, when both surfaces are evaluated to a value within a subdivision, the intersection may be within this subdivision which can then be further subdivided to check, with higher resolution, for the location of the intersection.

In cases where the point clouds were not derived from parameterized first and second surfaces, the method may further include parameterizing the first set of points on the first surface and a second set of points on the second surface or otherwise mapping the first set of points on the first surface and a second set of points on the second surface to a parameter space. Alternatively and/or additionally, the first set of points on the first surface and a second set of points on the second surface may be generated, unparameterized, in the object space of the surfaces or mapped from a parameter space to an object space.

The choice of between parameter space and object space may be made with consideration for the environment of the surfaces and/or 3D model(s). For example, the greater accuracy of the parameter space may be suitable for CAE, CAM or CAD scenarios while the accuracy of object space may be sufficient for computer-aided animation.

Figure 5:
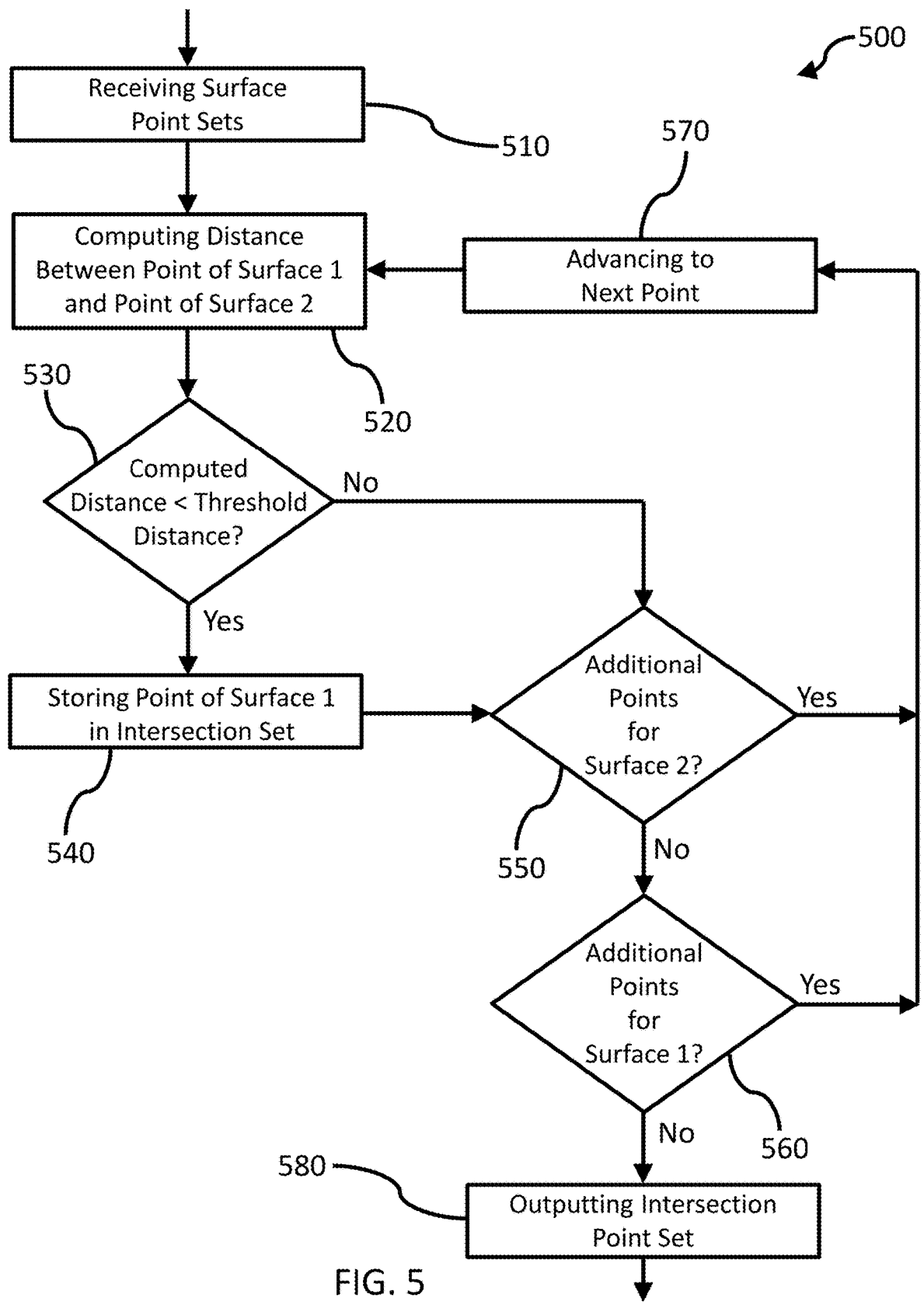
FIG. 5 illustrates a flow of another example computer-implemented method for locating an intersection.
Figure 6:
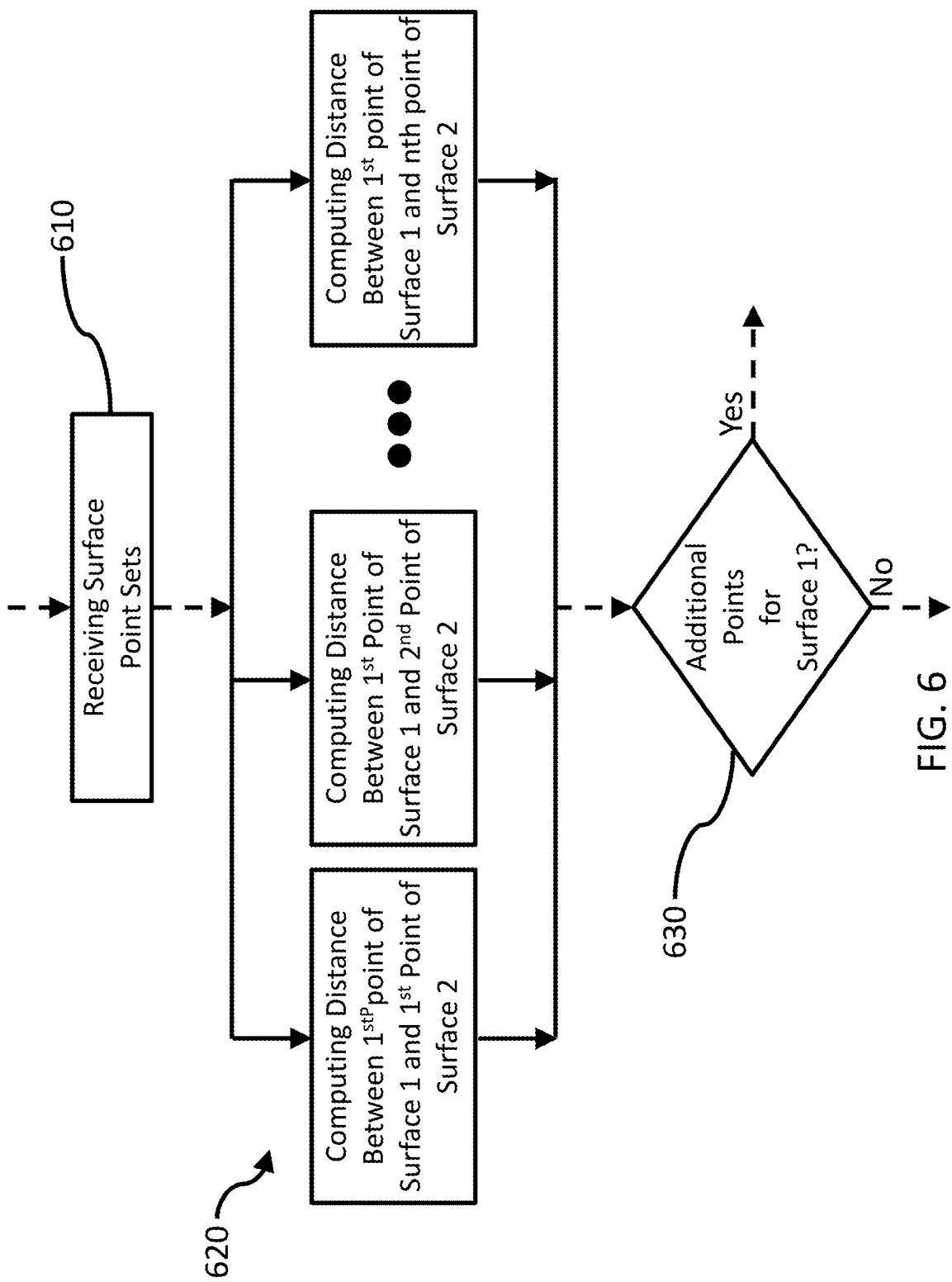
FIG. 6 illustrates a flow of an example computer-implemented parallel processing method for locating an intersection.
Figure 8:
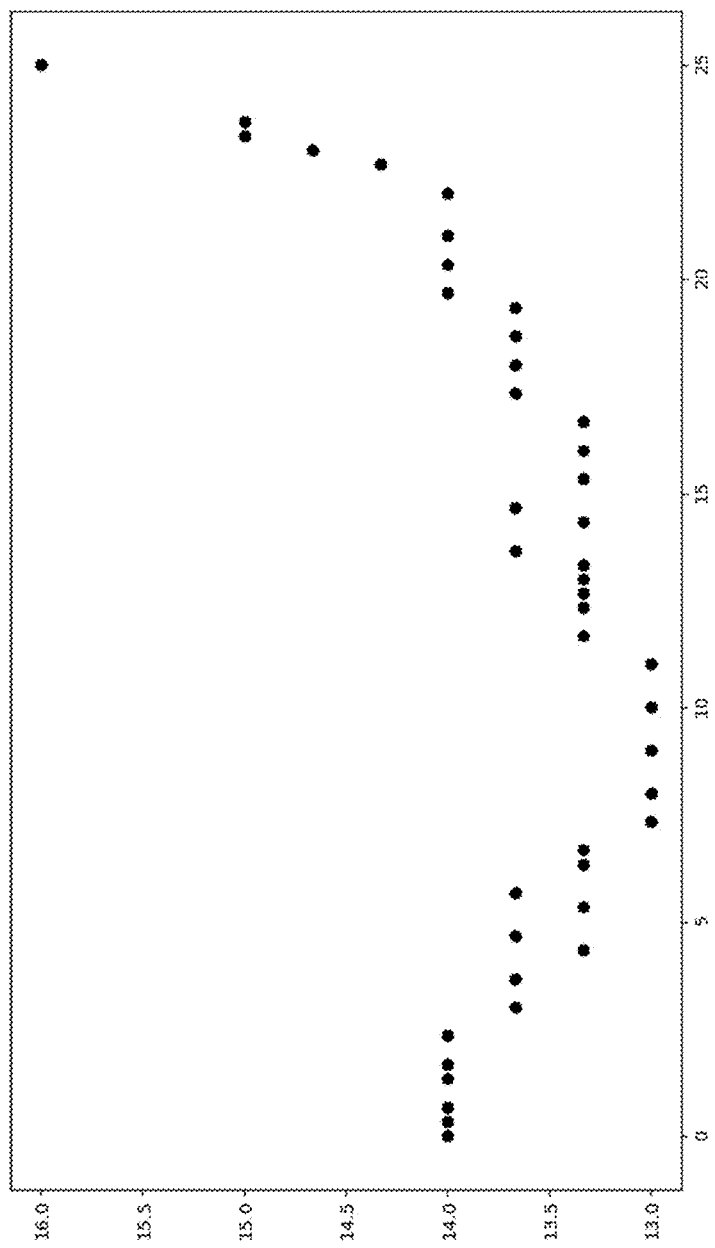
FIG. 8 illustrates an example parameterization of the set of intersection points of FIG. 7.

FIGS. 5, 6 & 8 illustrate actions of a detailed computer-implemented method 500 for computing an intersection between first and second surfaces in accordance with an embodiment of the disclosure. The example method 500 is depicted as a collection of actions in a logical flow diagram, which represents a sequence of actions that may be implemented in hardware, software, or a combination thereof.

A first set of points representing the first surface and a second set of points representing the second surface are received at 510. A first set of intersection points may be formed from the points representing the first surface and the points representing the second surface. The first set of intersection points may be a subset of the set of points representing the reference surface when the first surface taken as a reference surface against which the second surface is measured. The flatter surface may be selected as the reference surface so that mapping between a parameter space and an object space will have a more accurate result.

This first set of intersection points will be formed from identified, collected, gathered and/or grouped points representing the reference surface which are each less than a pre-established threshold distance from and/or are closer than the pre-established threshold distance to at least one point representing the second surface. It follows that the points of the intersection set also have a proximity to points representing the second surface which is greater than a threshold. In an example, the points of the intersection set are grouped from parameterized points representing the first surface.

The nearness of points representing the first surface to points representing the second surface is tested by, at 520, computing or otherwise determining a distance between each point representing the first surface and each point representing the second surface and, at 530, comparing the distances with a threshold distance.

In an example, distance may be computed as:

$$d = \sqrt[2]{(x_2 - x_1)^2 + (y_2 - y_1)^2 + (z_2 - z_1)^2}$$

where $(x_1, y_1, z_1)$ reflects a point of the first surface and $(x_2, y_2, z_2)$ reflects a point of the second surface.

In practice, point representations will be consistent in description such that distance is determined between two points in object space or two points in parameter space but not points described in both spaces. At 530, it may be determined whether the computed distance is not less than a threshold. In other words, it may be determined whether the distance is greater than or equal to a threshold $\varepsilon$ such that $d \geq \varepsilon$ or whether the square of the distance is greater than or equal to some other threshold $\sigma$ such that $d^2 \geq \sigma$. If so, it is determined whether there are additional points representing the second surface at 550. If there are additional points representing the second surface, the method advances to the next point at 570 in order to compute or otherwise determine the distance between the point representing the first surface and the next point representing the second surface.

When $d < \varepsilon$ or $d^2 < \sigma$, the point representing the first surface is stored in a first set of intersection points at 540 and it is again determined whether there are additional points representing the second surface at 550. If there are additional points representing the second surface, the method advances as described above from 570.

When it is determined there are no additional points representing the second surface, it is determined whether there are any additional points representing the first surface at 560. When there are additional points representing the first surface, the method advances to the next point representing the first surface at 570 and computes or otherwise determines the corresponding distance for each of the points representing the second surface. When there are no additional points representing the first surface, the first set of intersection points is output at 580.

The first set of intersection points may lie on or otherwise represent the first surface in an object space of the first and/or second surfaces or in a parameter space of the first and/or second surfaces.

For improved processing speed, two or more distance computations and/or two or more threshold comparisons may be made contemporaneously or simultaneously by processing in parallel. For example, referring to FIG. 6, with surface point sets received at an action 610 (which may be indistinguishable from action 510), the distance between a first point representing the first surface and two or more points representing the second surface may be computed contemporaneously, simultaneously or in parallel at 620 before determining whether additional, unevaluated points representing the first surface exist at 630.

In another example (not shown), the distances between two or more points representing the first surface and a point representing the second surface may be computed contemporaneously, simultaneously or in parallel. In yet another example, the distances between a first point representing the first surface and two or more points representing the second surface may be compared with the threshold contemporaneously, simultaneously or in parallel. In a still further example, the distances between two or more points of the set representing the first surface and a point representing the second surface may be compared contemporaneously, simultaneously or in parallel.

Figure 7:
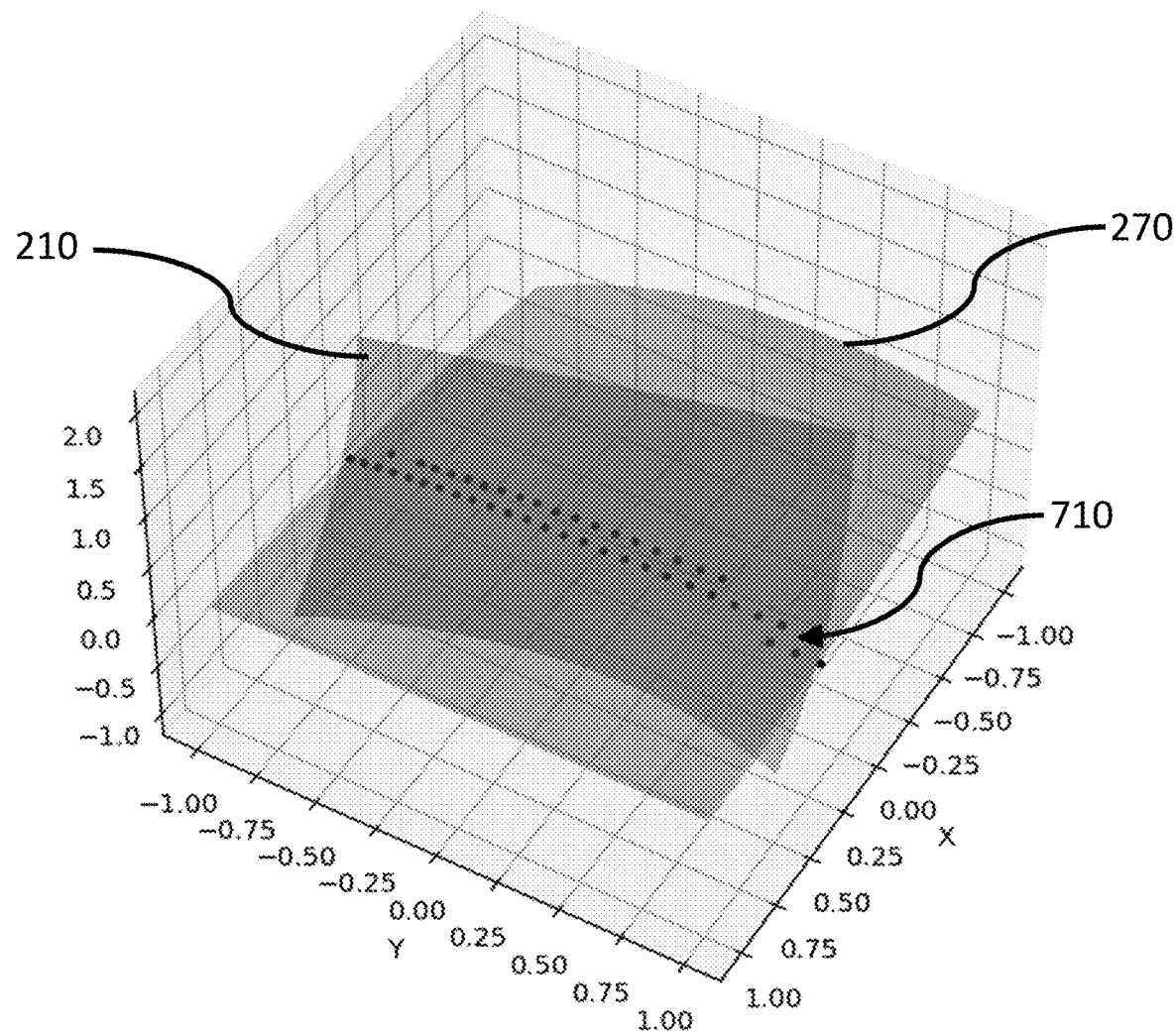
FIG. 7 illustrates an example set of intersection points which may result from actions of disclosed computer-implemented methods.

FIG. 7 illustrates, along with surfaces 210 and 270, an example first set of intersection points 710 which may result from disclosed computer-implemented methods. FIG. 8 illustrates an example parameterization of an example set of intersection points of FIG. 7.

Figure 9:
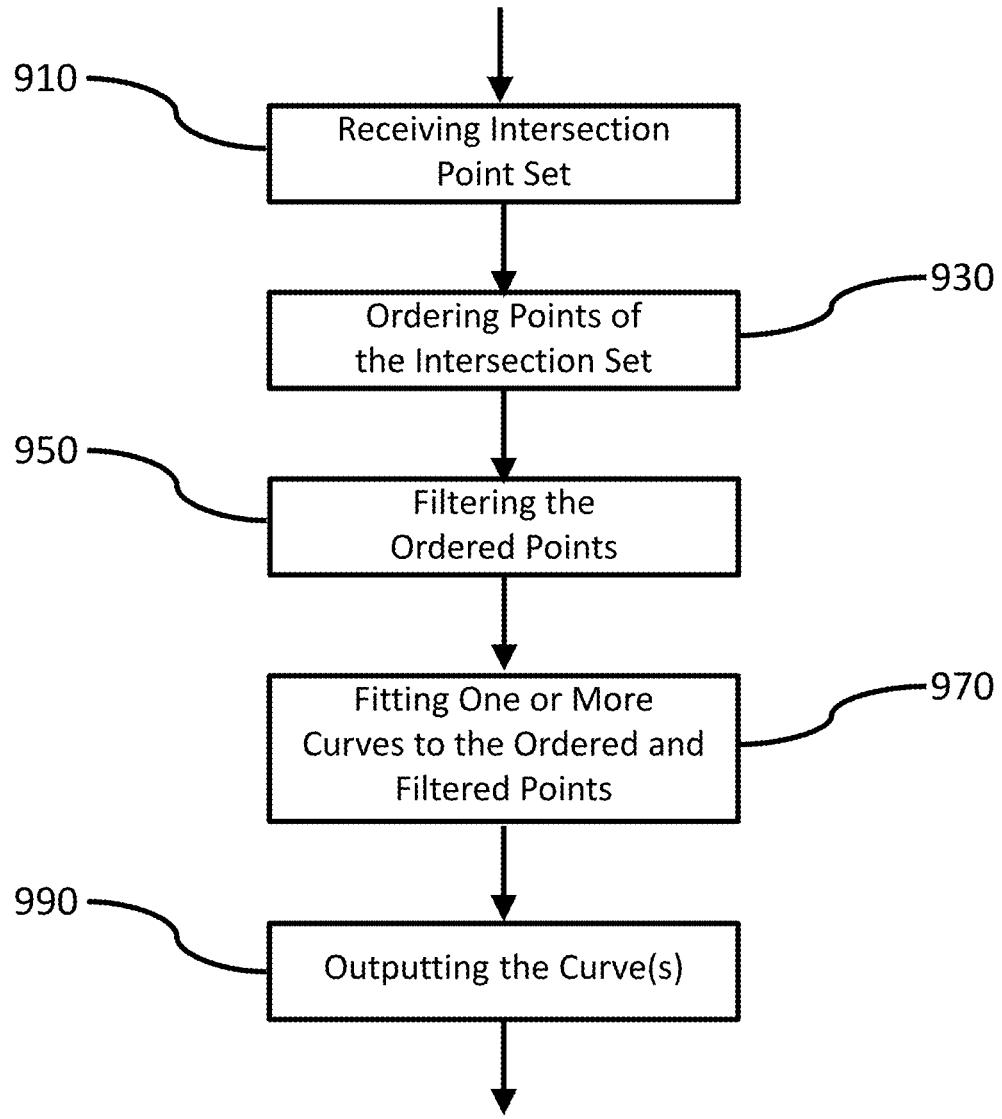
FIG. 9 illustrates a flow of another example computer-implemented method for locating an intersection.

Referring to FIG. 9, the points received at 910 on the first surface which are each less than a threshold distance from at least one point on the second surface may be ordered at 930. The points may be ordered according to any of a variety of example sorting techniques including but not limited to selection sorting, heap sorting, quick sorting. In another example, a starting point may be found by checking which sides of an initially chosen point of the first intersection set other points of the intersection set lie on. When a point is found for which all points are on one side, that point is defined as the starting point. With a starting point established, other points may be scanned for their proximity to the starting point and the points may be ordered according to decreasing proximity to the starting point as found in "nearest neighbor" methods for determining the starting point.

Figure 10:
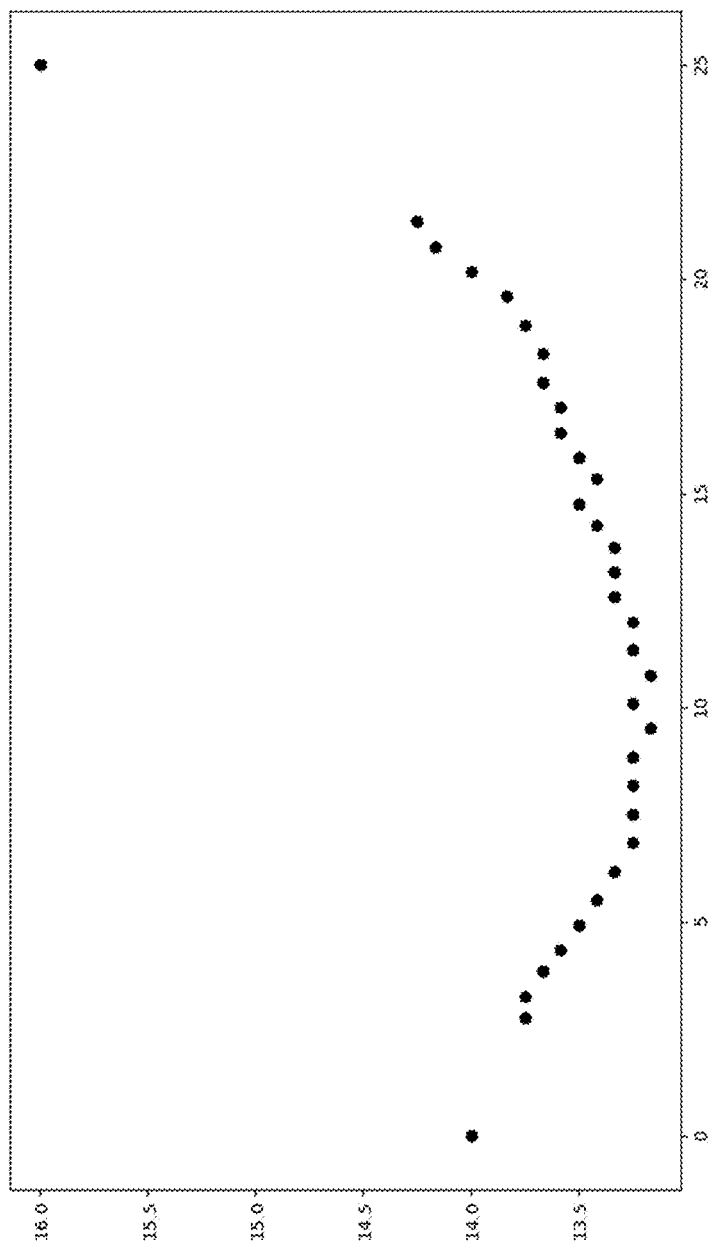
FIG. 10 illustrates the example set of intersecting points of FIG. 7 post processing.
Figure 11:
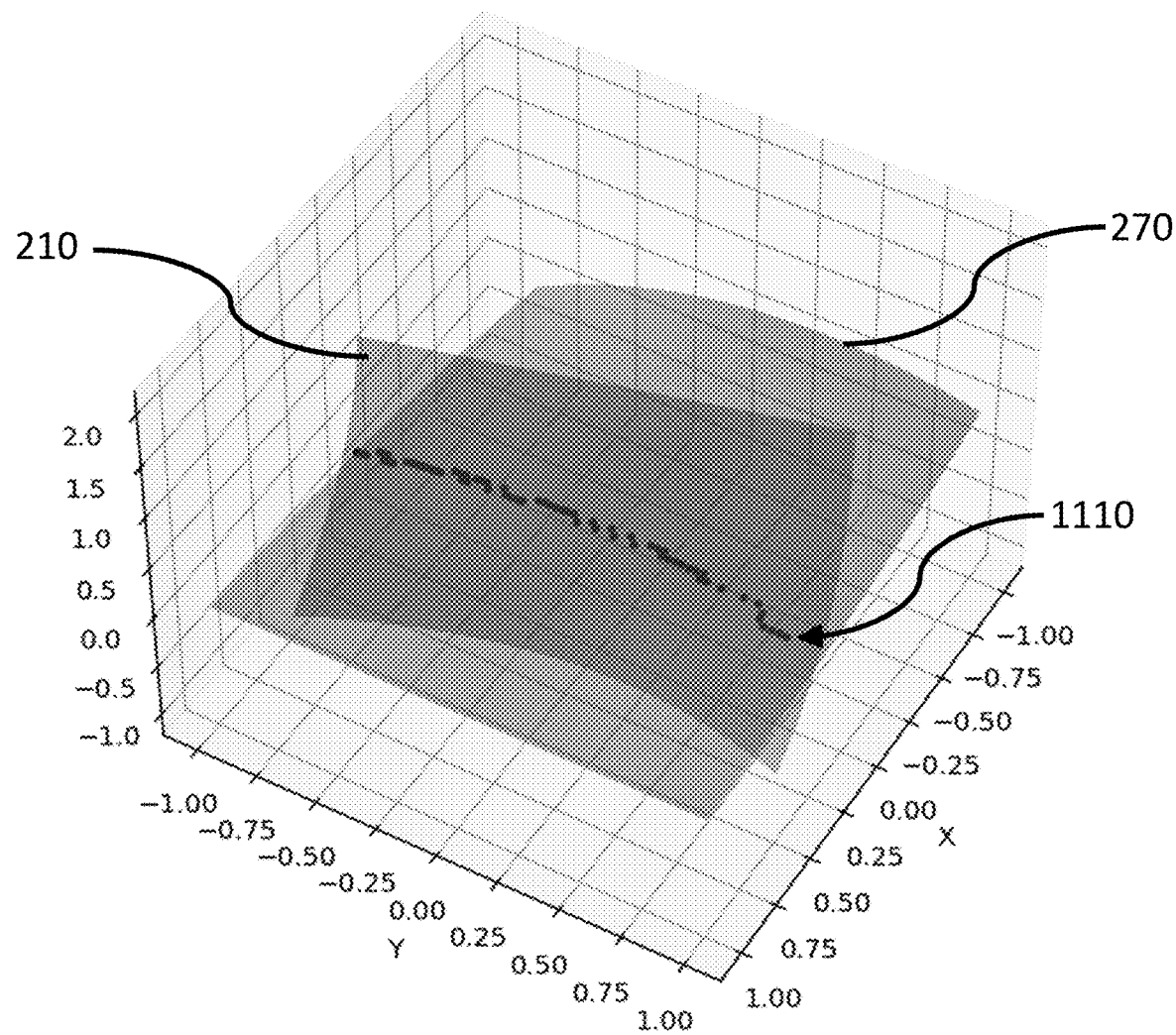
FIG. 11 illustrates an example set of intersection points convolved and mapped to an object space.

The points on the first surface which are each less than a threshold distance from at least one point on the second surface may be filtered or otherwise processed at 950. For example, the points of the first intersection set may be filtered by convolving and/or eliminating redundant points thereof. FIG. 10 illustrates the example set of intersecting points of FIG. 7 treated with convolution. FIG. 11 illustrates an example set of intersection points 1110 convolved and mapped to the object space of surfaces 210 and 270.

Continuing, at 970, one or more intersection curves which fit the set of intersection points are computed. The one or more intersection curves may be or otherwise include a piecewise curve, a Bezier curve, a b-spline, a NURBs curve and/or another type of interpolating or approximating curve.

Figure 12:
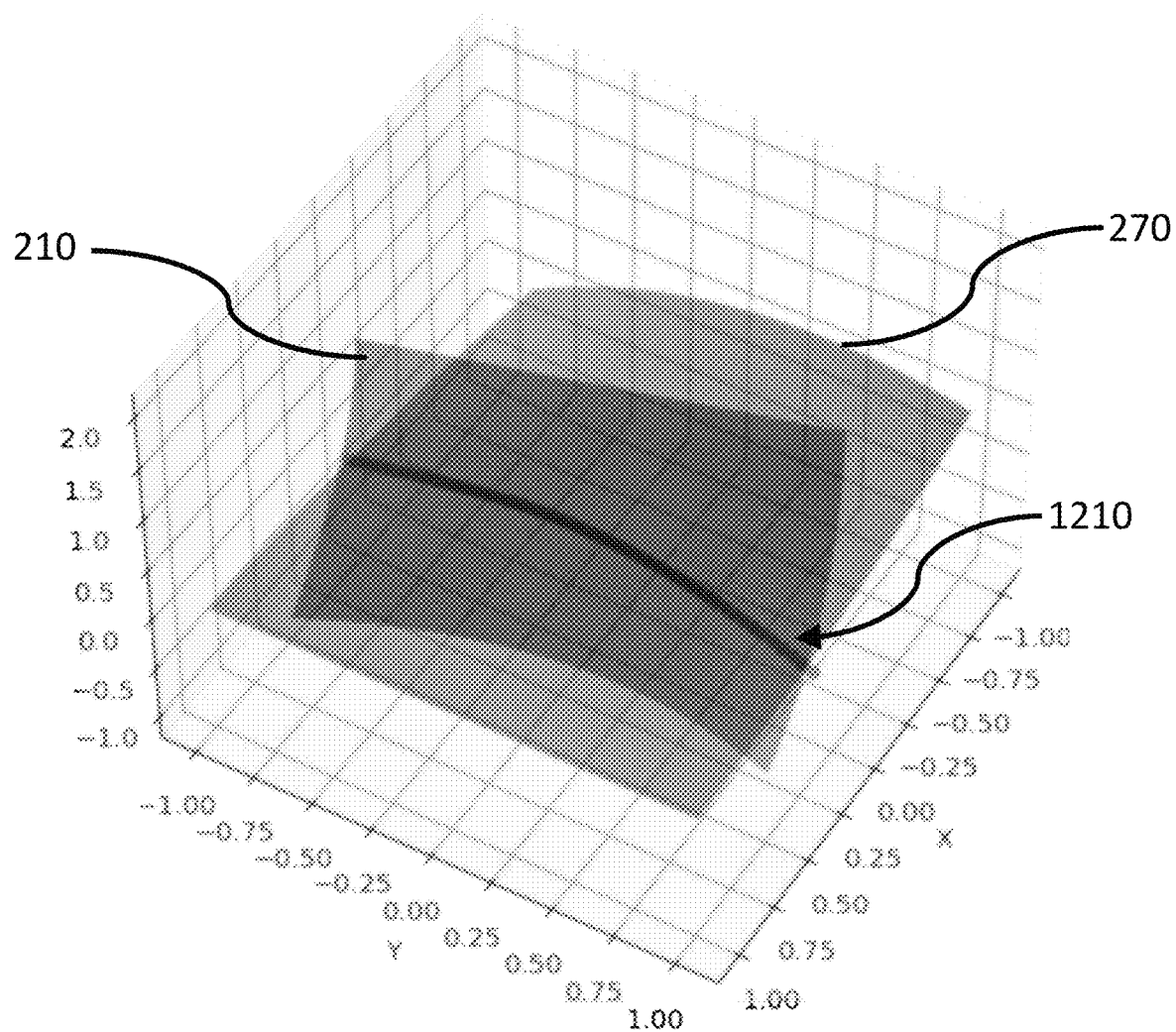
FIG. 12 illustrates an example fit of one or more curves to a set of intersection points.

The one or more curves are output as the intersection at 990. The one or more intersection curves may be output as descriptive data in a parameter space of the first and/or second surfaces and/or the 3D model(s). The method may further include mapping the one or more curves from the parameter space to the object space, for example, with one or more polynomials which may be rational polynomials. FIG. 12 illustrates, along with first surface 210 and second surface 270, an example fit of a curve 1210 to a set of intersection points such as points 710 or points 1110.

Disclosed methods may further include (not illustrated to avoid redundancy) using the descriptions of the first and second surfaces to find one or more curves that fit to a set of points on or otherwise representing the second surface which are each less than a threshold distance from at least one point on the first surface.

Thus, a second set of intersection points may be formed from the set of points representing the first surface and the set of points representing the second surface. With the second surface taken as a reference surface against which the first surface is measured, the second set of intersection points may be a subset of the set of points representing the reference surface. This subset will be formed from identified, collected, gathered and/or grouped points representing the reference surface which are each less than a pre-established threshold distance from and/or closer than the pre-established threshold distance to at least one point of the points representing the first surface. Alternatively stated, the points of the intersection set have a proximity to points representing the first surface which is greater than a threshold.

The nearness of points representing the second surface to points representing the first surface is tested by determining a distance between each point representing the second surface and each point representing the first surface and comparing the distances with a threshold distance. The second set of intersection points may lie on or otherwise represent the second surface in an object space of the first and/or second surfaces or in a parameter space of the first and/or second surfaces.

As with actions described above in reference to FIGS. 5 ε 6, for improved processing speed, two or more computations and/or two or more comparisons may be made contemporaneously or simultaneously by processing in parallel. As above with regard to points on the first surface, the points on the second surface which are each less than a threshold distance from at least one point on the first surface may be ordered and/or filtered.

Continuing, one or more intersection curves which fit the set of intersection points are computed and may be or include one or more interpolating and/or approximating curves. The one or more intersection curves may be output as descriptive data in a parameter space of the first and/or second surfaces and/or the 3D model(s). The one or more curves may be mapped from the parameter space to the object space, for example, with one or more polynomials.

The actions described above with reference to FIGS. 5-12 are only illustrative and other alternatives can also be provided where one or more actions are added, one or more actions are removed, or one or more actions are provided in a different sequence without departing from the scope of the claims herein.

The method may further include (not illustrated) filtering, blending, averaging or computing the central tendency of the identified intersection points on the first surface with the identified intersection points on the second surface.

Alternatively and/or additionally, the one or more curves that fit to a set of points representing the first surface which are each less than a threshold distance from at least one point representing the second surface may be filtered, blended or averaged with the one or more curves that fit to a set of points representing the second surface which are each less than a threshold distance from at least one point representing the first surface or a central tendency of the first and second curves may be computed. For example, a healing surface may be created between the one or more curves fit to a first intersection set and the one or more curves fit to the second intersection set.

In some cases, input surfaces may not have an intersection and a notification or other indication of this condition may be output to a user. For example, if no pair of points representing each of the surfaces is less than the threshold distance apart, there may not be an intersection and this may be communicated by the method. In another example, if no pair of points is less than a given threshold, the threshold may be adjusted for greater sensitivity.

Figure 13:
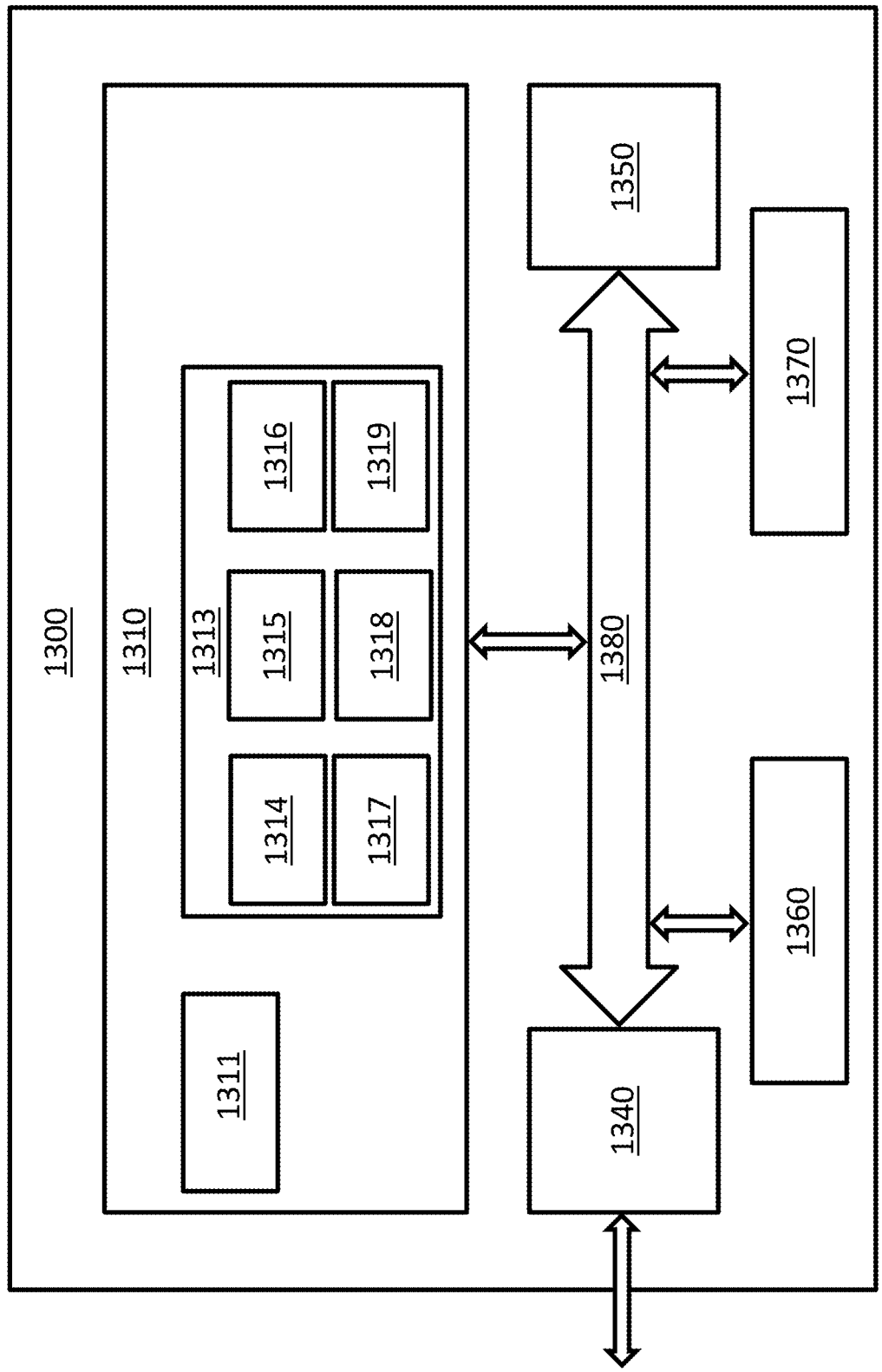
FIG. 13 schematically illustrates an example system suitable for use in association with disclosed computer-implemented methods for locating an intersection.

Disclosed computer-implemented methods may be suitable for use in association with any of a variety of systems. FIG. 13 is a schematic illustration of various components of an example system 1300 for computing an intersection in accordance with an embodiment of the disclosure. System 1300 may include, but is not limited to, a memory 1310, computing hardware such as a CPU 1360, Input/Output (I/O) devices 1340, a parallel processing unit 1350, a storage 1370, a configuration of sensors (not illustrated) and a system bus 1380 that operatively couples various components including memory 1310, CPU 1360, I/O devices 1340, parallel processing unit 1350, storage 1370 and the sensors.

System 1300 also includes a power source (not shown) for supplying electrical power to the various components of system 1300. The power source may, for example, include a rechargeable battery.

CPU 1360 is capable of processing computer-readable instructions provided by various applications including a surface-to-surface intersection application 1313 and other applications 1311 in order to execute various actions associated with the instructions.

Parallel processing unit 1350 may be of a variety capable of processing multiple threads in parallel. Parallel processing unit 1350 may be capable of processing any number of threads contemporaneously or simultaneously and may employ any of a variety of classes of parallel processing including but not limited to multi-core processing, symmetric multiprocessing, distributed computing, cluster computing, massively parallel computing, grid computing, cloud computing and combinations thereof.

I/O devices 1340 may include a display screen for presenting graphical images to a user of the system. The graphical images may include but are not limited to surfaces, curves, points which may represent intersection surfaces or intersections therebetween. In some examples, the display screen may be a touch-sensitive display screen that is operable to receive tactile inputs from the user. These tactile inputs may, for example, include clicking, tapping, pointing, moving, pressing and/or swiping with a finger or a touch-sensitive object like a pen. Additionally or alternatively, I/O devices 1340 include a mouse or a joystick that is operable to receive inputs corresponding to clicking, pointing, and/or moving a pointer object on the graphical user interface. I/O devices 1340 may also include a keyboard that is operable to receive inputs corresponding to pushing certain buttons on the keyboard. Additionally, I/O devices 1340 may also include a microphone for receiving an audio input from the user, and a speaker for providing an audio output to the user.

Moreover, the sensors may include one or more of: an accelerometer, a magnetometer, a pressure sensor, a temperature sensor or a gyroscopic sensor. The sensors may be used to measure and collect data related to intersecting surfaces, intersections of the surfaces or to the surroundings of the user. In some examples, the software product may be interfaced with the sensors. When executed on processor 1360, the software product is configured to resolve and integrate the outputs of the sensors into useful information about intersecting surfaces, intersections of the surfaces or to the surroundings of the user.

In some examples, the sensors may include a GPS sensor for determining one or more absolute spatial positions of the user, the system or 3D models upon a surface of the Earth. In some examples, the sensors may include a timer for including time-stamps with stored intersecting surfaces, intersections of the surfaces or the surroundings of the user. Alternatively, CPU 1360 may provide system time as reference for including the time-stamps.

Furthermore, I/O devices 1340 may include a network interface which optionally allows CPU 1360 to download points, curves, surfaces, 3D models or descriptions of any of these from a server or other source, for example, via a communication network. Conversely, the network interface optionally allows CPU 1360 to upload points, curves, surfaces, 3D models or descriptions of any of these to a server. Moreover, the network interface optionally allows system 1300 to communicate with other data processing units.

Memory 1310 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards. Memory 1310 stores an application 1313 for computing/finding surface-to-surface intersections as well as other applications 1311.

Application 1313 for computing or otherwise finding surface-to-surface intersections may include a sampling module 1314, a distance testing module 1315, an ordering module 1316, a filtering module 1317, a curve fitting module 1318 and a mapping module 1319. Modules 1314, 1315, 1316, 1317, 1318 and 1319 may, for example, be parts of a software product associated with the intersection computing service provided by the system. Executing the software product on the CPU 1360 and/or parallel processing unit 1350, in part, results in generating and rendering a graphical user interface on the display screen. The graphical user interface is configured to facilitate user interactions with the intersection computing service. The network interface may allow CPU 1360 to access a server to update the software product and/or download one or more new software products associated with the intersection computation service.

Application 1313 is configured to receive, from storage 1370, I/O 1340 or the network interface, a description for each of the first and second surfaces. The first and second surfaces may be described in a parameter space and/or object space. In some example systems, mapping module 1319 may translate surfaces or descriptions thereof between parameter and object spaces periodically, during strategically determined phases of intersection computations and output or on demand of CPU 1360, parallel processing unit 1350, application 1313 or system 1310.

Parallel processing unit 1350 is configured by instructions stored on memory 1310 to use the descriptions to compute one or more intersection curves. Sampling module 1314 or parallel processing unit 1350 as configured in accordance with sampling module 1314 may, from the description of the first surface, derive a set of points or a point cloud representing the first surface and, from the description of the second surface, derive a set of points or a point cloud representing the second surface.

Distance testing module 1315 or parallel processing unit 1350 as configured in accordance with distance testing module 1315 may form a first set of intersection points from the set of points representing the first surface and the set of points representing second surface. The first set of intersection points may be formed from a subset of the set of points representing the first surface. In a further example, the first set of intersection points may be formed from a subset of points representing the first surface which are each less than a threshold distance from at least one point of the points representing the second surface.

Distance testing module 1315 or parallel processing unit 1350 as configured in accordance with distance testing module 1315 may compute a distance between each point representing the first surface and each point representing the second surface, compare the distances with a threshold distance and form a first set of intersection points from each point of the set representing the first surface which has a distance from one or more points of the set representing the second surface which is less than the threshold distance.

Example constructions for testing module 1315 as coded in computer readable instructions include:

```
def SSI_bspline (meshF,meshC,gridTol):
    point_list=[ ]; uv_list=[ ]
    for i in range (len (meshF)):
        for j in range (len (meshC)):
            if ((meshF [i] [0]-meshC [j] [0])**2+ (meshF [i] [1]-
                meshC [j] [1])**2+ (meshF [i] [2]-meshC [j] [2])
                **2)<gridTol:
                point_list.append ((meshC [j] [0], meshC [j] [1],
                    meshC [j] [2])) return point_list
```

Distance testing module 1315 or parallel processing unit 1350 as configured in accordance with distance testing module 1315 may form a second set of intersection points from the set of points representing the first surface and the set of points representing second surface. The second set of intersection points may be formed from a subset of the set of points representing the second surface. In a further example, the second set of intersection points may be formed from a subset of points representing the second surface which are each less than a threshold distance from at least one point representing the first surface.

Distance testing module 1315 or parallel processing unit 1350 as configured in accordance with distance testing module 1315 may compute a distance between each point representing the second surface and each point representing the first surface, compare the distances with a threshold distance and form a second set of intersection points from each point representing the second surface which has a distance from one or more points representing the first surface which is less than the threshold distance.

Distance testing module 1315 or parallel processing unit as configured in accordance with distance testing module 1315 may determine, compare and form by computing, comparing and forming in a parameter space or in an object space of the first and/or second surfaces depending on the application of the application 1313. In some example systems, mapping module 1319 may translate points or descriptions thereof between parameter and object spaces periodically, during strategically determined phases of intersection computations and output or on demand of CPU 1360, parallel processing unit 1350, application 1313 or system 1310.

Distance testing module 1315 or parallel processing unit 1350 as configured in accordance with distance testing module 1315 may determine the distance between each point of a set of points representing the first surface and each point of a set of points representing the second surface by determining the distance between a first point of the set representing the first surface and each point of the set representing the second surface in parallel with determining the distance between a second point of the set representing the first surface and each point of the set representing the second surface.

Ordering module 1316 or parallel processing unit 1350 as configured in accordance with ordering module 1316 may order points on the first surface which are each less than a threshold distance from at least one point on the second surface. Ordering module 1316 or parallel processing unit 1350 as configured in accordance with ordering module 1316 may order the points according to any of a variety of sorting techniques including but not limited to selection sorting, heap sorting, quick sorting or a combination of these. In another example, ordering module 1316 or parallel processing unit 1350 as configured in accordance with ordering module 1316 may a find a starting point and determine which sides of an initially chosen point other points lie on. The starting point may be defined as a point for which all points lie only on a single side. In a "nearest neighbor" technique for determining the starting point, ordering module 1316 or parallel processing unit 1350 as configured in accordance with ordering module 1316 may scan other points for their proximity to the starting point and the points may be ordered according to decreasing proximity to the starting point.

Filtering module 1317 or parallel processing unit 1350 as configured in accordance with filtering module 1317 may filter the points on the first surface which are each less than a threshold distance from at least one point on the second surface. For example, the points of the first intersection set may be filtered by convolving and/or eliminating redundant points thereof.

Curve fitting module 1318 or parallel processing unit 1350 as configured in accordance with curve fitting module 1318 fit one or more curves to the set or sets of the intersection points and output the one or more intersection curves. The one or more intersection curves may be or otherwise include a piecewise curve, a Bezier curve, a b-spline and/or a NURBs curve. Curve fitting module 1318 or parallel processing unit 1350 as configured in accordance with curve fitting module 1318 may output the one or more intersection curves as data descriptive of the one or more intersection curves in a parameter space or an object space of the first and/or second surfaces. In some example systems, mapping module 1319 may translate curves or descriptions thereof between parameter and object spaces periodically, during strategically determined phases of intersection computations and output or on demand of CPU 1360, parallel processing unit 1350, application 1313 or system 1310.

Moreover, storage 1370 is a non-transient data storage medium. The software product, when executed on the processor 1360, is optionally coupled to storage 1370, and is configured to cause processor 1360 to receive surface descriptions from storage 1370. Further, the software product, when executed on CPU 1360 or parallel processing unit 1350, is optionally coupled to storage 1370, and is configured to substantially continuously record and update intersection points or curves in storage 1370. The software product, when executed on CPU 1360 or parallel processing unit 1350, is optionally configured to record its last updated status in storage 1370, in case of interruptions in the operable state of modules 1314-1319, application 1313, system 1300 and/or the graphical user interface. Additionally, the software product, when executed on CPU 1360 or parallel processing unit 1350, may store points, curves, surfaces, 3D models or descriptions of any of these in storage 1370.

The system 1300 is optionally implemented by way of at least one of: a mobile phone, a smart telephone, an MID, a tablet computer, a UMPC, a phablet computer, a PDA, a web pad, a PC, a handheld PC, a laptop computer, a desktop computer, a server workstation, a main frame, a supercomputer, an NAS device, a large-sized touch screen with an embedded PC, and an interactive entertainment device, such as a game console, a TV set and an STB.

Embodiments of the disclosure provide a computer program product that includes a non-transitory or non-transient computer-readable storage medium storing computer-executable code for intersection computation. The code, when executed, is configured to perform actions of the methods as described in conjunction with FIGS. 1, 3, 5, 6 & 9. As actions of the disclosed methods may be provided in different sequences, so the computer-executable code may be configured to provide a service having a different sequence of actions from those illustrated in FIGS. 1, 3, 5, 6 & 9. In some examples, the code may be downloaded from a software application store, for example, from an "App store", to a data processing unit.

Generally, the computer program product may be represented in modules 1314-1319 which may include various routines, programs, objects, components, data structures, etc., that are stored or embodied in one or more types of computer-readable media, as described above, and perform particular tasks or operations or implement particular abstract data types. Computer-readable media may be understood as any available media that can store and/or embody computer executable instructions and that may be accessed by a computing system such as 1300 or computing process.

FIG. 13 is merely an example, which should not unduly limit the scope of the claims herein. It is to be understood that the specific designation for system 1300 is provided as an example and is not to be construed as limiting system 1300, application 1313 or modules 1314-1319 to specific numbers, types, or arrangements. A person having ordinary skill in the art will recognize many variations, alternatives, and modifications of embodiments of the disclosure.

Embodiments of the disclosure are susceptible to being used for various purposes, including, though not limited to, enabling users to compute SSI by employing a parallel processor-acceleratable algorithm that not only accelerates the task of finding intersections but also provides a framework for preserving geometric information between points, enhancing the utility and accuracy of 3D surface modeling. Resulting intersections may be useful for object modeling, trimming, collision detection or a combination of these.

While disclosed methods have generally been described as applicable to two surfaces in 3-dimensional space, applications may exist for more than two surfaces in any number of dimensions.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim the disclosure are intended to be construed in a non-exclusive manner, namely allowing for items, components or elements not explicitly described also to be present. Reference to the singular is also to be construed to relate to the plural.

What is claimed is:

1. A computer-implemented method for computing an intersection between first and second surfaces of one or more 3D models, comprising:
   receiving a description for each of the first and second surfaces;
   using the descriptions to compute one or more intersection curves by:
      determining a distance between each point of a set of points representing the first surface and each point of a set of points representing the second surface;
      forming a first set of intersection points from each point of the set representing the first surface which has a distance from one or more points of the set representing the second surface which is less than a threshold distance; and
   outputting the one or more intersection curves.

2. The method as set forth in claim 1, wherein using the descriptions to compute the one or more intersection curves further comprises forming a second set of intersection points.

3. The method as set forth in claim 1, wherein the determining the distance between each point of a set of points representing the first surface and each point of a set of points representing the second surface further comprises determining the distance between a first point of the set representing the first surface and each point of the set representing the second surface in parallel with determining the distance between a second point of the set representing the first surface and each point of the set representing the second surface.

4. The method as set forth in claim 1, wherein outputting the one or more intersection curves further comprises outputting one or more curves which fit the set of intersection points.

5. The method as set forth in claim 1, wherein forming the first set of intersection points further comprises forming a first set of intersection points which lie on the first surface in an object space of the first and/or second surfaces.

6. A system for computing an intersection, comprising:
   a memory;
   a storage;
   a parallel computing processor configured by instructions stored on the memory to:
      receive a description for each of the first and second surfaces;
      use the descriptions to compute one or more intersection curves by
         computing a distance between each point of a set of points representing the first surface and each point of a set of points representing the second surface; and
         forming a first set of intersection points from each point of the set representing the first surface which has a distance from one or more points of the set representing the second surface which is less than a threshold distance; and
      output the one or more intersection curves.

7. The system as set forth in claim 6 wherein the processor is configured to use the descriptions to compute the one or more intersection curves by forming a second set of intersection points from the set of points representing the first surface and the set of points representing second surface.

8. The system as set forth in claim 6, wherein the processor is configured to compute the distance between each point of a set of points representing the first surface and each point of a set of points representing the second surface by computing the distance between a first point of the set representing the first surface and each point of the set representing the second surface in parallel with computing the distance between a second point of the set representing the first surface and each point of the set representing the second surface.

9. The system as set forth in claim 6, wherein the processor is configured to output the one or more intersection curves as one or more curves which fit the first set of intersection points.

10. The system as set forth in claim 6, wherein the processor is configured to form the first set of intersection points by forming a set of intersection points which lie on the first surface in an object space of the first and/or second surfaces.

11. A non-transitory computer readable medium for computing an intersection, comprising computer readable instructions which, when executed by a processor, cause one or more computers to:
    receive a description for each of the first and second surfaces;
    use the descriptions to
       determine a distance between each point of a set of points representing the first surface and each point of a set of points representing the second surface; and
       form a first set of intersection points from each point of the set representing the first surface which has a distance from one or more points of the set representing the second surface which is less than a threshold distance; and
    output the first set of intersection points.

12. The computer readable medium as set forth in claim 11, wherein the computer readable instructions which cause the one or more computers to use the descriptions to compute the one or more intersection curves further cause the one or more computers to form a second set of intersection points from the set of points representing the first surface and the set of points representing second surface.

13. The computer readable medium as set forth in claim 11, wherein the computer readable instructions which cause the one or more computer to determine the distance between each point of a set of points representing the first surface and each point of a set of points representing the second surface further cause the one or more computers to determine the distance between a first point of the set representing the first surface and each point of the set representing the second surface in parallel with determining the distance between a second point of the set representing the first surface and each point of the set representing the second surface.

14. The computer readable medium as set forth in claim 11, wherein the computer readable instructions which cause the one or more computers to output the one or more intersection curves further cause the one or more computers to output one or more curves which fit the first set of intersection points.

15. The computer readable medium as set forth in claim 11, wherein the computer readable instructions which cause the one or more computers to form the first set of intersection points further cause the one or more computers to form a first set of intersection points which lie on the first surface in an object space of the first and/or second surfaces.

16. A computer-implemented method for determining a set of intersection points between first and second surfaces of one or more 3D models, comprising:
    receiving a description for each of the first and second surfaces;

from the description of the first surface, deriving a set of points representing the first surface; and forming the set of intersection points from points representing the first surface which are distanced from the second surface by less than a threshold distance.

* * * * *